United States Patent
Garcia et al.

(10) Patent No.: US 10,534,979 B2
(45) Date of Patent: *Jan. 14, 2020

(54) SYSTEMS AND METHODS TO DISTINGUISH BETWEEN FEATURES DEPICTED IN IMAGES

(71) Applicant: GoPro, Inc., San Mateo, CA (US)

(72) Inventors: Vincent Garcia, Issy-les-Moulineaux (FR); Maxime Schwab, Paris (FR); Francois Lagunas, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,548

(22) Filed: May 21, 2019

(65) Prior Publication Data

US 2019/0272445 A1  Sep. 5, 2019

Related U.S. Application Data

(63) Continuation of application No. 16/257,366, filed on Jan. 25, 2019, now Pat. No. 10,354,167, which is a
(Continued)

(51) Int. Cl.
*G06K 7/00* (2006.01)
*G06K 9/62* (2006.01)
(Continued)

(52) U.S. Cl.
CPC .......... *G06K 9/6215* (2013.01); *G06K 9/4604* (2013.01); *G06K 9/4652* (2013.01);
(Continued)

(58) Field of Classification Search
CPC .................. G06K 9/00–82; G06T 7/00–97
See application file for complete search history.

(56) References Cited

U.S. PATENT DOCUMENTS 9,390,348 B2 * 7/2016 Zheng .................. G06K 9/6276
9,449,398 B2 * 9/2016 Saptharishi .............. H04N 7/18
(Continued)

FOREIGN PATENT DOCUMENTS

EP    2334058      9/2016
WO    2010073192   7/2010

OTHER PUBLICATIONS

Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.
(Continued)

*Primary Examiner* — Sean T Motsinger
(74) *Attorney, Agent, or Firm* — Esplin & Associates, PC

(57) ABSTRACT

Systems and methods of distinguishing between feature depicted in an image are presented herein. Information defining an image may be obtained. The image may include visual content comprising an array of pixels. The array may include pixel rows. An identification of a pixel row in an image may be obtained. Distances of individual pixels and/or groups of pixels from the identified row of pixels may be determined. Parameter values for a set of pixel parameters of individual pixels of the image may be determined. Based on one or more of the distances from the identified row of pixels, parameter values of one or more pixel parameters, and/or other information, individual pixels and/or groups of pixels may be classified as one of a plurality of image features.

20 Claims, 4 Drawing Sheets

Related U.S. Application Data continuation of application No. 15/271,206, filed on Sep. 20, 2016, now Pat. No. 10,192,143.

(51) Int. Cl.
| | | |
|---|---|---|
| *G06T 7/20* | (2017.01) | |
| *G06T 7/11* | (2017.01) | |
| *G06T 7/13* | (2017.01) | |
| *G06T 7/90* | (2017.01) | |
| *G06K 9/46* | (2006.01) | |
| *G06K 9/52* | (2006.01) | |
| *G06T 7/60* | (2017.01) | |

(52) U.S. Cl.
CPC .............. *G06K 9/52* (2013.01); *G06K 9/6267* (2013.01); *G06T 7/11* (2017.01); *G06T 7/13* (2017.01); *G06T 7/20* (2013.01); *G06T 7/60* (2013.01); *G06T 7/90* (2017.01); *G06T 2207/10024* (2013.01)

(56) References Cited

U.S. PATENT DOCUMENTS

| | | | |
|---|---|---|---|
| 2004/0017492 A1 | 1/2004 | Stavely | |
| 2007/0236366 A1* | 10/2007 | Gur | G06K 9/00 340/945 |
| 2007/0291990 A1* | 12/2007 | Rebut | G01S 11/12 382/104 |
| 2009/0202177 A1 | 8/2009 | Jeffrey | |
| 2012/0070071 A1* | 3/2012 | Rankin | G06K 9/00805 382/154 |
| 2013/0286221 A1* | 10/2013 | Shechtman | G06T 5/00 348/187 |
| 2014/0022394 A1 | 1/2014 | Bae | |
| 2014/0314270 A1* | 10/2014 | Nguyen | G06K 9/0063 382/103 |
| 2015/0323648 A1* | 11/2015 | Haglund | G01C 21/20 701/4 |
| 2015/0332127 A1* | 11/2015 | Zheng | G06T 7/11 382/165 |

OTHER PUBLICATIONS

Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.

Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.

* cited by examiner

SYSTEMS AND METHODS TO DISTINGUISH BETWEEN FEATURES DEPICTED IN IMAGES

FIELD

This disclosure relates to systems and methods configured to distinguish between features depicted in images.

BACKGROUND

Distinguishing between features depicted in images may be useful for applying image effects. For example, it may be advantageous to distinguish between sky and a mountain ridge depicted in an image so that image effects, such as text, may appear to scroll into the image from behind the mountain ridge.

SUMMARY

This disclosure relates to systems and methods configured to distinguish between features depicted in an image. An image may include an array of pixels. Parameter values of a set of pixel parameters may be determined for individual pixels in an array of pixels of an image. Individual pixels may be classified as depicting one of a plurality of features. The classification may be based on one or more of the parameter values of the set of pixel parameters of the individual pixels, distances of the individual pixels from a row of pixels identified in an array, and/or other information.

A system that distinguishes between features depicted in an image may include one or more physical processors and/or other components. The one or more physical processors may be configured by machine-readable instructions. Executing the machine-readable instructions may cause the one or more physical processors to facilitate distinguishing between features depicted in an image. The machine-readable instructions may include one or more computer program components. The computer program components may include one or more of an image component, a horizon component, a distance component, a parameter component, a classification component, and/or other computer program components.

The image component may be configured to obtain information defining one or more images. An image may include visual content. The visual content may be in the form of an array of pixels of the image. An individual array of pixels may include multiple pixel rows. The information defining the image may define individual colors of individual pixels and/or other information.

The horizon component may be configured to obtain identifications of individual rows of pixels in individual images as depicting a horizon.

The distance component may be configured to obtain, for individual pixels above and/or below an identified row of pixels in an individual image, individual distances of the individual pixels from the identified row of pixels. By way of non-limiting illustration, for a given image, the distance component may be configured to obtain one or more of a first distance of a first pixel in an image above an identified row of pixels, a second distance of a second pixel below the identified row of pixels, and/or other distances of other pixels of the image from the identified row of pixels.

The parameter component may be configured to obtain, for individual pixels above and/or below an identified row of pixels in an individual image, parameter values for a set of pixel parameters of the pixels in the individual image. In some implementations, a set of pixel parameters may include at least a first pixel parameter. By way of non-limiting illustration, the parameter component may be configured to obtain one or more of a first parameter value of the first pixel parameter for the first pixel, a second parameter value of the first pixel parameter for the second pixel, and/or other parameter values for the first pixel, second pixel, and/or other pixels.

The classification component may be configured to classify individual pixels of individual images as depicting one of a plurality of features. In some implementations, a plurality of features may include one or more a first feature, a second feature, and/or other features. Classification may be based on one or more of individual distances of individual pixels from individual identified rows of pixels, individual parameter values for a set of pixel parameters of individual pixels, and/or other information. By way of non-limiting illustration, based on one or more of the first distance above the row of pixels, the first parameter value, and/or other information, the first pixel may be classified as depicting the first feature and/or other image features. By way of non-limiting illustration, based on one or more of the second distance below the row of pixels, the second parameter value, and/or other information, the second pixel may be classified as depicting the second feature.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
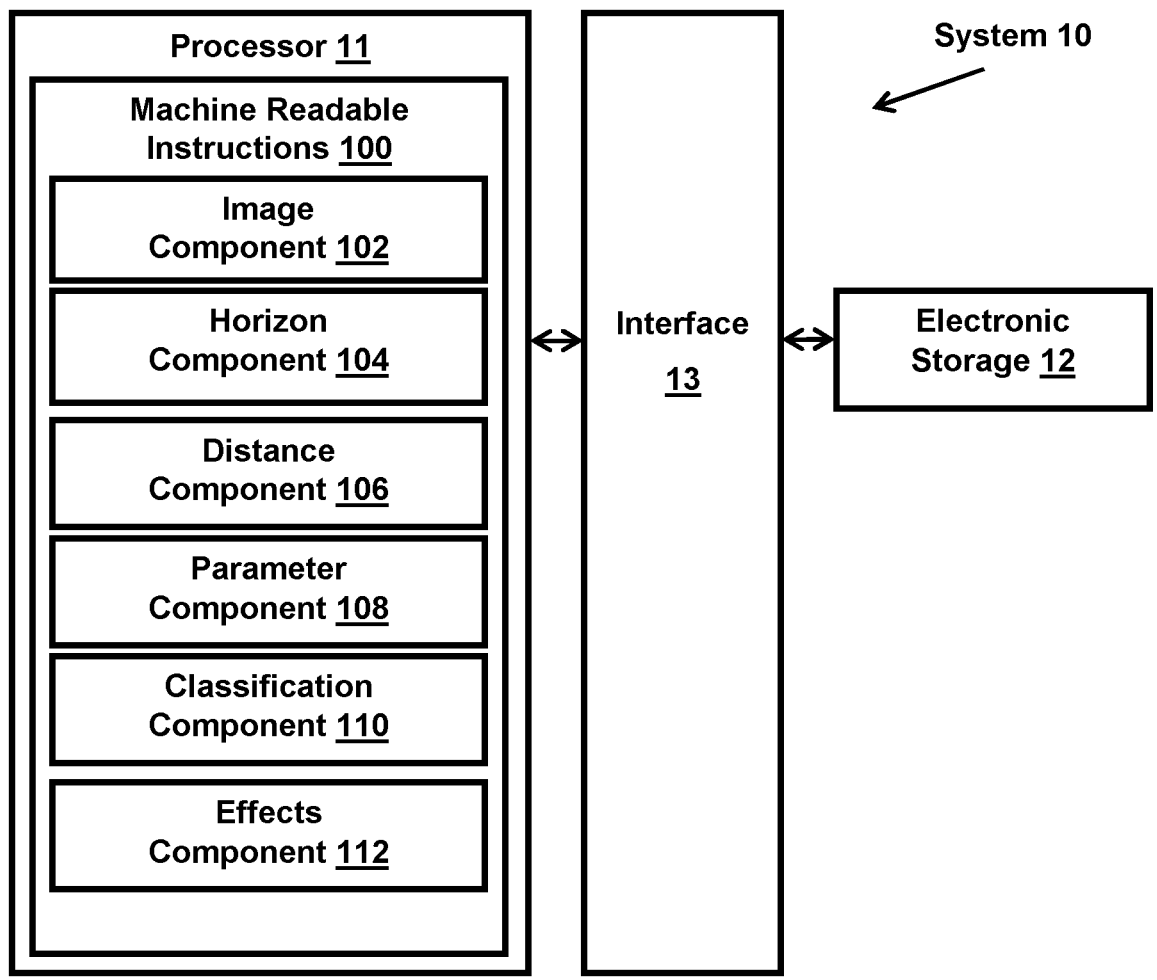
FIG. 1 illustrates a system configured to distinguish between features depicted in an image, in accordance with one or more implementations.

FIG. 1 illustrates a system 10 configured to distinguish between features depicted in an image, in accordance with one or more implementations. System 10 may include one or more of a processor 11, electronic storage 12, interface 13 (e.g., bus, wireless interface, etc.), and/or other components. Electronic storage 12 may include electronic storage medium that electronically stores information. Electronic storage 12 may store software algorithms, information determined by processor 11, information received remotely, and/or other information that enables system 10 to function properly. For example, electronic storage 12 may store information related to one or more of images, videos, image exemplars, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine readable instructions 100. Executing machine-readable instructions 100 may cause processor 11 to facilitate distinguishing between features depicted in an image. Machine-readable instructions 100 may include one or more computer program components. Machine readable instructions 100 may include one or more of an image component 102, a horizon component 104, a distance component 106, a parameter component 108, a classification component 110, an effects component 112, and/or other computer program components.

Image component 102 may be configured to obtain information defining one or more images, and/or other information. Information defining an image may include, for example, an image file. A image file may be obtained from electronic storage of one or more capture devices and/or other storage locations. An image may include visual content and/or other content. The visual content of an image may be in the form of a pixel array. Information defining an image may define colors of individual pixels in a pixel array of the image and/or other information. In some implementations, a pixel array may include multiple pixel rows, and/or other configurations of pixels.

In some implementations, an image may depict a scene. The scene may include scene features (also referred to as "features" and/or "image features"). The scene features may include depictions of one or more of sky, land, a horizon, and/or other features. In some implementations, a depiction of a sky may include depictions of one or more of clouds, birds, sun, moon, stars, airplanes, and/or other features. In some implementations, a depiction of land may include depictions of one or more of terrestrial features of earth (e.g., landforms such as mountains, volcanoes, etc.), objects (e.g., trees, bushes, animals, buildings, cars, etc.), people, and/or other features. In some implementations, a horizon may refer to one or both of a visible line within an image at which the earth's surface and the sky appear to meet and/or a line intended to depict where the earth's surface and the sky appear meet.

In some implementations, individual pixel colors may be specified by values of one or more color components, and/or other information. For example, individual colors may be specified with respect to a color space and/or other specifications. A color space may include one or more of an RGB color space, sRGB color space, an RGBY colors pace, a CMYK color space, and/or other color space representations. A color specified within a color space may be defined by chromaticities of different color components associated with the space, and/or other information. For example, an RGB color space may include a red color component, a green color component, and a blue color component. Individual colors may be specified as values of the color component values that may comprise one or more of chromaticities of individual ones of the red, green, and/or blue components (e.g., a red color channel, a green color channel, and a blue color channel), luminosity of individual ones of the red, green, and/or blue components (e.g., a red color channel, a green color channel, and a blue color channel), and/or other information.

In some implementations, information defining one or more images may be obtained from information defining one or more videos. Information defining a video may include, for example, a video file. A video file may be obtained from electronic storage of one or more capture devices and/or other storage locations. A video may include one or more of visual content, audio content, and/or other content. The visual content may be in the form of individual pixel arrays of individual frame images in a set of multiple frame images. Information defining a video may define colors of individual pixels in individual pixel arrays of individual frame images and/or other information. The multiple frame images may be presented in an ordered sequence. The audio content may include recorded and/or provided audio that may accompany visual content. The audio content may be synchronized with visual content. In some implementations, one or more videos may be characterized by one or more encoded framerates. An encoded framerate may define a number of frame images within a video per a time duration (e.g., number of frame images per second, etc.).

A capture device may include one or more sensors coupled to the capture device, and/or other components. A capture device may be configured for one or both of video capture and/or image capture. In some implementations, sensors coupled to a capture device may include one or more of an image sensor, a geo-location sensor, orientation sensor, accelerometer, and/or other sensors. An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors. A geo-location sensor may generate output signals conveying location(s) of a capture device over time. An orientation sensor may be configured to generate output signals conveying orientation of a capture device and/or entity moving with a capture device over time. An accelerometer may be configured to generate output signals conveying physical acceleration experienced by a capture device and/or entity moving with the capture device over time.

Image component 102 may be configured to obtain information defining one or more images from one or more storage locations. A storage location may include electronic storage 12, electronic storage of one or more capture devices (not shown in FIG. 1), and/or other storage locations. Image component 102 may be configured to obtain information defining one or more images during acquisition of the information and/or after acquisition of the information by one or more capture devices. For example, image component 102 may obtain information defining one or more images while the one or more images are being captured by one or more capture devices. Image component 102 may obtain information defining one or more images after the one or more images have been captured and/or stored in memory (e.g., electronic storage 12, etc.).

While one or more implementations of features present in this disclosure may be directed to individual images, one or more other implementations of the system may be configured for other types media content. Other types of media content may include one or more of multimedia presentations, photos, slideshows, burst shot images, and/or other media content.

The horizon component 104 may be configured to obtain, for individual images, an identification of one or more rows of pixels as depicting a horizon. In some implementations, a horizon may refer to one or more of a visible line within an image at which the earth's surface and the sky appear to meet and/or a line intended to depict where the earth's surface and the sky meet. A horizon may extend horizontally across a plane of an image. In some implementations, a horizon may be identified in an image whether or not a demarcating line may be visible in the image. By way of non-limiting illustration, an image depicting a mountain landscape may not visibly depict a horizontal horizon line, however, a row of pixels may be identified as a line intending to depict a horizon. In some implementations, identification of one or more rows of pixels in an image as depicting a horizon may be accomplished via one or more of user input (e.g., a user-selected row of pixels), a trained machine-learning process configured to identify a row of pixels as depicting a horizon, and/or other techniques. By way of non-limiting illustration, for individual images, a user may select (e.g., via input in a user interface) a row of pixels in an image as depicting a horizon in the image.

The distance component 106 may be configured to obtain, for individual pixels above and/or below an identified row of pixels of an individual image, individual distances of the individual pixels from the identified row of pixels. In some implementations, individual distances may be expressed in units of one or more of pixels, inches, picas, centimeters, points, and/or other units of distance. In some implementations, individual distances may correspond to perpendicular distances, e.g., shortest distance from a point (e.g., a pixel) to a line (e.g., an identified row of pixels). In some implementations, distance from a row of pixels may be represented as one of a positive or negative value. In some implementations, a row of pixels comprising an origin; where values in one direction (e.g., above the row of pixels) may be positive values, and values in another direction (e.g., below the row of pixels) may be negative values.

Distances may be obtained by utilizing one or more distancing techniques configured to determine distances of one or more pixels from an identified row of pixels. A distancing technique may include one or more of a digital ruler, image statistics (local and/or global), neighborhood information (e.g. color values (or other information) of pixels in the neighborhood), and/or other techniques. By way of non-limiting illustration, for a given image, a first pixel may be a first distance above an identified row of pixels in an image, a second pixel may be a second distance below the row of pixels, and/or other pixels may be other distances above and/or below the identified row of pixels. The first distance may be expressed as a positive value. The second distance may be expressed as a negative value.

The parameter component 108 may be configured to determine one or more parameter values for pixel parameters of individual pixels of individual images. The pixel parameters may include a set of pixel parameters. The set of pixel parameters may include one or more of color parameters, image gradient parameters, and/or other pixel parameters.

Individual parameter values of color parameters of individual pixels may specify one or more of chromaticity of individual color components of individual pixels, luminous intensity of individual color components of individual pixels, and/or other information. For example, color parameters may include one or more of a first color parameter, a second color parameter, a third color parameter, and/or other color parameters.

A parameter value of a first color parameter may specify one or more of a chromaticity of a first color component of an individual pixel, a luminous intensity of the first color component of an individual pixel, and/or other information. By way of non-limiting illustration, in an RGB color space, the first color component may be the red color component (e.g., red color channel); and a parameter value of the first color parameter may specify one or more of a chromaticity of the red color component, a luminous intensity of the red color component, and/or other information.

A parameter value of a second color parameter may specify one or more of a chromaticity of a second color component of an individual pixel, a luminous intensity of the second color component of an individual pixel, and/or other information. By way of non-limiting illustration, in an RGB color space, the second color component may be the green color component (e.g., green color channel); and a parameter value of the second color parameter may specify one or more of a chromaticity of the green color component, a luminous intensity of the green color component, and/or other information.

A parameter value of a third color parameter may specify one or more of a chromaticity of a third color component of an individual pixel, a luminous intensity of the third color component of an individual pixel, and/or other information. By way of non-limiting illustration, in an RGB color space, the third color component may be the blue color component (e.g., blue color channel); and a parameter value of the third color parameter may specify one or more of a chromaticity of the blue color component, a luminous intensity of the blue color component, and/or other information.

Individual parameter values of individual image gradient parameters may specify one or more of an image gradient at a pixel in a first direction, an image gradient at a pixel in a second direction, a magnitude of an image gradient, and/or other information. For example, image gradient parameters may include one or more of a first image gradient parameter, a second image gradient parameter, a gradient magnitude parameter, and/or other parameters. The first image gradient parameter may correspond to an image gradient in a first direction; the second image gradient parameter may correspond to an image gradient in a second direction; and the gradient magnitude parameter may correspond to a magnitude of an image gradient.

In some implementations, image gradient may refer to directional change in one or both of intensity or color of an image. In some implementations, image gradient at individual pixels may comprise a 2D vector with vector components given by derivatives in a first direction (e.g., horizontal direction) and a second direction (e.g., vertical direction). At individual pixels, an image gradient vector may point in a direction of a largest possible intensity increase, and/or a length of the gradient vector may correspond to a rate of change in that direction.

The parameter component 108 may be configured to determine individual image gradients of individual images. In some implementations, an image gradient in a first direction, a second direction and/or a magnitude of image gradient may be determined from an image by applying one or more filters to the image, and/or by other techniques. A filter may include one or more of a Sobel filter, Sobel-Feldman filter, Scharr filter, Roberts Cross filter, Prewitt filter, Laplacian filter, Gabor filter, DoG (difference of Gaussians) filters, DoH (determinant of Hessian) filter, and/or other techniques.

By way of non-limiting illustration, an image may comprise an array of pixels having multiple pixel rows. The pixel rows may include a first pixel row and/or other pixel rows. The first pixel row may be identified as depicting a horizon in the image. For the pixels above and/or below the first pixel row, parameter component 108 may be configured to determined one or more of parameter values of a first pixel parameter of the pixels above and/or below the first pixel row, parameter values of a second pixel parameter of the pixels above and/or below the first pixel row, parameter values of a third pixel parameter of the pixels above and/or below the first pixel row, and/or other parameter values of other pixel parameters in a set of pixel parameters.

The classification component 110 may be configured to classify individual pixels of individual images as depicting one of a plurality of features. In some implementations, a plurality of features may include one or more a first feature, a second feature, and/or other features. Classification may be based on one or more of individual distances, individual parameter values for a set of pixel parameters, and/or other information.

By way of non-limiting illustration, based on one or more of a first pixel of an image being a first distance above an identified row of pixels, a first parameter value of a first pixel parameter being obtained for the first pixel, and/or other information, the first pixel may be classified as depicting a first feature and/or other features. By way of non-limiting illustration, based on one or more of a second pixel of the image being a second distance below an identified row of pixels in an image, a second parameter value of a first pixel parameter being obtained for the second pixel, and/or other information, the second pixel may be classified as depicting a second feature and/or other features.

In some implementations, classification component 110 may be configured to classify individual pixel groups of individual images as depicting one of a plurality of features. The classification component 110 may be configured such that classifying individual pixel groups may comprise one or more of determining pixel groups, classifying at least one pixel in the individual pixel groups as one of a plurality of features, classifying individual pixel groups as the same feature as the at least one pixel in the individual pixel groups, and/or other operations. For example, pixels assigned to a common group may be indicative of the pixels in the pixel group being part of a shared image feature. In some implementations, if at least one pixel in the pixel groups may be classified as a given feature, than this may be indicative that the pixel group is also part of the given feature. In some implementations, the at least one pixel of a pixel group which may facilitate classifying the pixel group as a shared feature may comprise a pixel of the pixel group that may be closest to an identified row of pixels (e.g., shortest distance above and/or below the identified row of pixels). By way of non-limiting illustration, classification component 110 may be configured such that responsive to at least one pixel in a pixel group being classified as an individual feature, the pixel group may also be classified as depicting the same feature.

The classification component 110 may be configured such that determining pixel groups may be based on one or more parameter values for a set of pixel parameters of individual pixels of individual images, and/or other information. In some implementations, a set of pixels may be assigned to an individual pixel group based on determining a correspondence between the pixels in the set of pixels. In some implementations, a correspondence may be determined by comparing individual parameter values of individual pixel parameters and/or sets of parameter values for a set of pixel parameters. By way of non-limiting illustration, pixel parameters may include color parameters corresponding to color components of individual pixels. A correspondence may be determined by comparing individual values of individual color parameters. For example, a correspondence may be determined by comparing individual chromaticities of individual color components (e.g., chromaticity values of individual ones of red, green, and/or blue color channels in an RGB space and/or other color space) and/or by comparing a set of chromaticities of a set of color components (e.g., a combination of chromaticities represented as point within an RGB color space and/or other color space). In some implementations, a correspondence may refer to a match and/or substantial match of parameter values. A match may refer to parameter values being the same. A substantial match may refer to parameter values falling within a predetermined range of parameter values. In some implementations, if individual parameter values and/or a set of parameter values for a set of pixels do not match and/or do not fall within a predetermined range, then a correspondence may not be determined and the set of pixels may not be assigned to the same pixel group.

In some implementations, determining correspondences by comparing a set of chromaticities of a set of color components may be based on Euclidean distance determined between colors in a color space. By way of non-limiting illustration, a correspondence between pixels may be determined based on a Euclidean distance between colors of the pixels plotted in a color space being less than or equal to a threshold distance.

By way of non-limiting illustration, classification component 110 may be configured to determine a first pixel group and/or other pixel groups. The first pixel group may include a first pixel and/or other pixels. Responsive to the first pixel being classified as depicting a first feature, the first pixel group may be classified as depicting the first feature.

In some implementations, classification based on one or more of individual distances, individual parameter values for a set of pixel parameters, and/or other information may be accomplished by one or more machine learning techniques, and/or other techniques. Machine learning techniques may include one or more of a convolutional neural network, decision tree learning, supervised learning, minimax algorithm, unsupervised learning, semi-supervised learning, reinforcements learning, deep learning, artificial neural network, support vector machine, clustering algorithm, genetic algorithm, random forest, and/or other techniques.

In some implementations, one or more user-provided exemplars of images having one or more user-provided classifications of user-identified pixels and/or pixels groups may be utilized at an initialization or training stage of a machine learning process. The user-provided exemplars may include identifications of one or more pixel rows as depicting a horizon. Parameter values of a set of pixel parameters of the identified pixels and/or pixel groups may be determined. Individual distances of individual pixels and/or pixel groups from an identified row of pixels may be determined. Information used to train a machine learning process may include one or more of user-identified pixels and/or pixel groups in image exemplars, user-provided classifications of the user-identified pixels and/or pixel groups, parameter values of a set of pixel parameters of the user-identified pixels and/or pixel groups, individual distances of the user-identified pixels and/or pixel groups from individual identified rows of pixels in the image exemplars, and/or other information. A quantity of image exemplars suitable to train a machine-learning network may be provided, for example, one or more of 1000 images, 10000 images, 100000 images, 1000000 images, and/or other amounts.

In some implementations, information input into a trained machine learning process may include one or more of parameter values of a set of pixels parameters of individual pixels and/or pixel groups in individual images, individual distances of individual pixels from an identified row of pixels in the individual images, and/or other information. Based on the input information, the trained machine learning process may be configured to classify, for individual images, individual pixels and/or pixel groups of as one of a plurality of image features.

In some implementations, classification component 110 may be configured to identify, based on classifications of individual pixels and/or groups of pixel in individual images, individual sets of pixels in the individual images as depicting individual feature boundaries. In some implementations, feature boundaries may be identified when adjacent pixels are classified as different image features, such that one or both of the adjacent pixels may correspond to a boundary between the different image features.

By way of non-limiting illustration, based on a first pixel being classified as a first feature and a second pixel, that is adjacent to the first pixel, being classified as a second feature, classification component 110 may be configured to identify one or both of the first pixel and/or second pixel as depicting a boundary between the first feature and second feature.

The effects component 112 may be configured to effectuate one or more image effects on individual images based on classifications of individual pixels and/or pixel groups (e.g., via classification component 110). Image effects may include one or more of text effects, transition effects, and/or other image effects. Image effects may be determined through user input via one or more image editing interfaces and/or applications (not shown in FIG. 1). In some implementations, effectuating one or more image effects on individual images based on classification may comprise effectuating one or more image effects based on one or more sets of pixels identified as depicting individual feature boundaries. In some implementations, a text effect may be effectuated by utilizing one or more sets of pixels identified as depicting individual feature boundaries as a reference on the image. By way of non-limiting illustration, a text effect may comprise text that scrolls over an image. The text may scroll upward, downward, across, and/or other direction. Utilizing a set of pixels depicting a feature boundary as a reference may allow the text effect to appear as if it is appearing from behind a given feature of an image (see, e.g., FIG. 5). Other text and/or image effects may be effectuated based on classifications of individual pixels and/or pixel groups in individual images.

Figure 3:
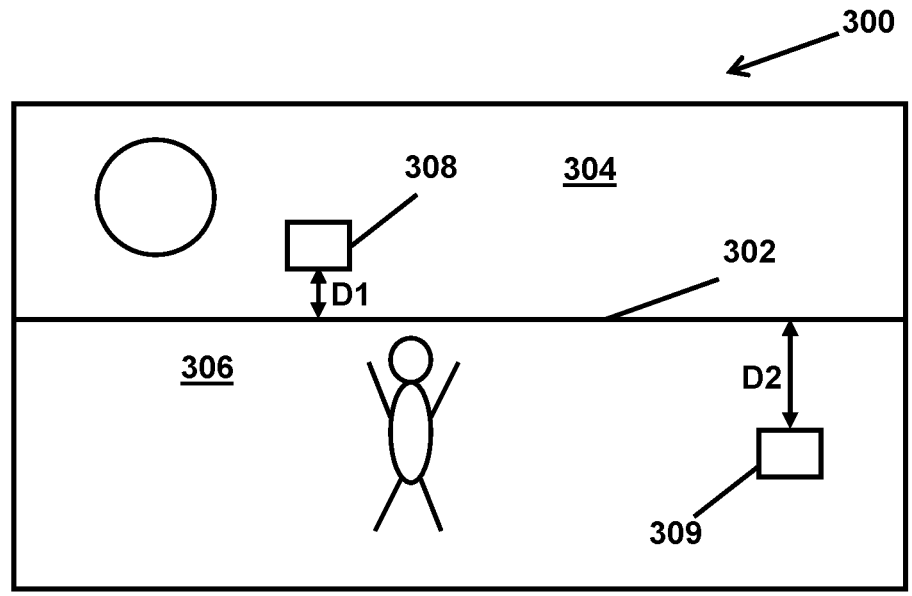
FIG. 3 illustrates an exemplary image illustrating one or more aspects of distinguishing between features depicted in the image.

FIG. 3 illustrates an exemplary image 300 illustrating one or more aspects of system 100 (FIG. 1) presented herein. The image 300 may depict a scene. The scene may include features including depictions of one or more of sky 304, land 306, a horizon 302, and/or other features. The horizon 302 may correspond to a row of pixels that may depict a line at which the earth's surface (e.g., land 306) and sky 304 appear to meet. FIG. 3 illustrates a first pixel group 308, a second pixel group 309, and/or other pixel groups and/or individual pixels. The first pixel group 308 may be a first distance, D1, above horizon 302. The first distance, D1, may represent a distance of at least one pixel in first pixel group 308 that may be closest to horizon 302. The second pixel group 309 may be a second distance, D2, below horizon 302. The second distance, D2, may represent a distance of at least one pixel in second pixel group 309 that may be closest to horizon 302. In some implementations, based on one or more of parameter values of one or more pixel parameters of the pixels in first pixel group 308, distance D1, and/or other information, first pixel group 308 may be classified as depicting a first image feature (e.g., sky 304). In some implementations, based on one or more of parameter values of one or more pixel parameters of the pixels in second pixel group 309, distance D2, and/or other information, second pixel group 309 may be classified as depicting a second image feature (e.g., land 306).

Figure 4:
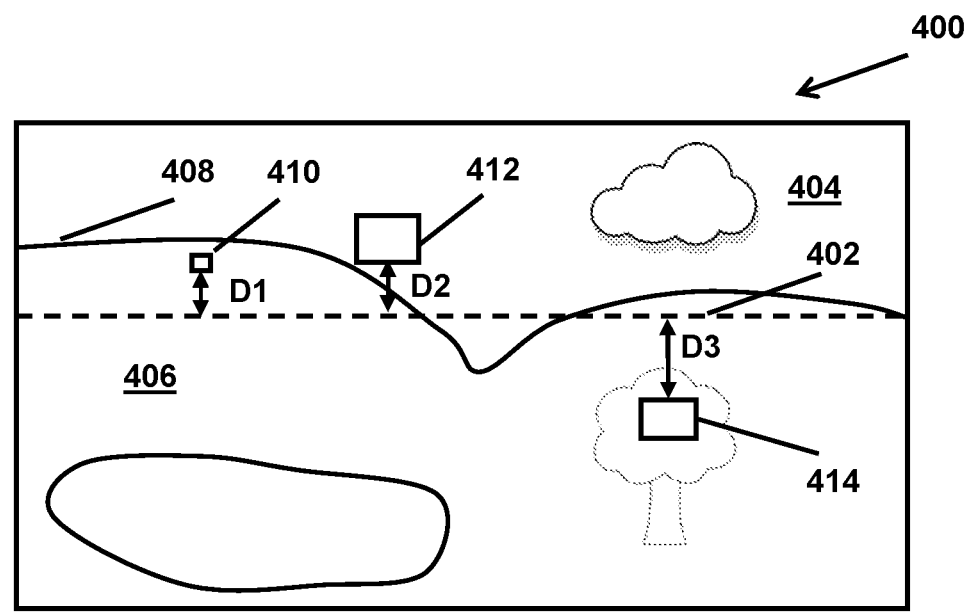
FIG. 4 illustrates another exemplary image illustrating one or more aspects of distinguishing between features depicted in the image.

FIG. 4 illustrates another exemplary image 400 illustrating one or more aspects of system 100 (FIG. 1) presented herein. The image 400 may depict a scene, for example, a mountain landscape including depictions of sky 404, land 406 (e.g., a mountain range), and/or other scene features. The image 400 may not explicitly depict a visible horizon comprising a horizontal line. One or more implementations of system 100 (FIG. 1) may be configured to identify a row of pixels corresponding to a line 402 as intended to depict a horizon in the image 400. FIG. 4 illustrates a first pixel 410, a first pixel group 412, a second pixel group 414, and/or other pixel groups and/or individual pixels. The first pixel 410 may be a first distance, D1, above line 402. The first pixel group 412 may be a second distance, D2, above line 402. The second distance, D2, may represent a distance of at least one pixel in first pixel group 412 that may be closest to line 402. The second pixel group 414 may be a third distance, D3, below line 402. The third distance, D3, may represent a distance of at least one pixel in second pixel group 414 that may be closest to line 402. In some implementations, based on one or more of parameter values of one or more pixel parameters of pixel 410, D1, and/or other information, pixel 410 may be classified as depicting a first image feature (e.g., land 406). In some implementations, based on one or more of parameter values of one or more pixel parameters of the pixels in first pixel group 412, distance D2, and/or other information, first pixel group 412 may be classified as depicting a second image feature (e.g., sky 404). In some implementations, based on one or more of parameter values of one or more pixel parameters of the pixels in second pixel group 414, distance D3, and/or other information, second pixel group 414 may be classified as depicting the first image feature (e.g., land 406). In some implementations, based on the classifications of individual pixels and/or pixel groups of image 400, a set of pixels may be identified as depicting boundary 408 between sky 404 and land 406.

Figure 5:
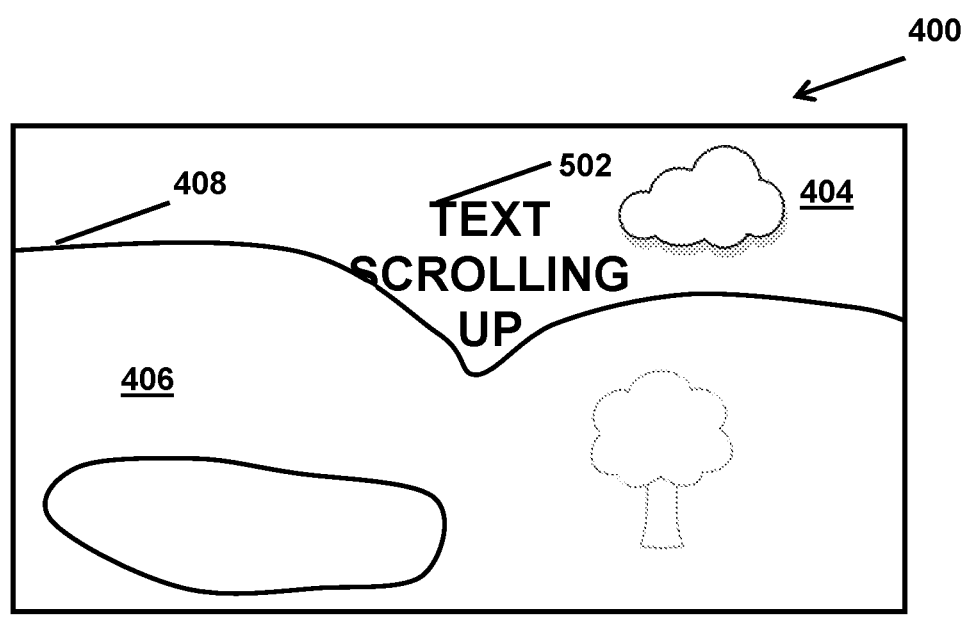
FIG. 5 illustrates an exemplary image illustrating application of one or more image effects.

FIG. 5 illustrates image 400 (FIG. 4) and application of one or more image effects based on an identification of image boundary 408. By way of non-limiting illustration, an image effect may comprise a text effect, such as text 502 scrolling upward and appearing to appear from behind image boundary 408.

Returning to FIG. 1, although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, and/or 112 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, and/or 112 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
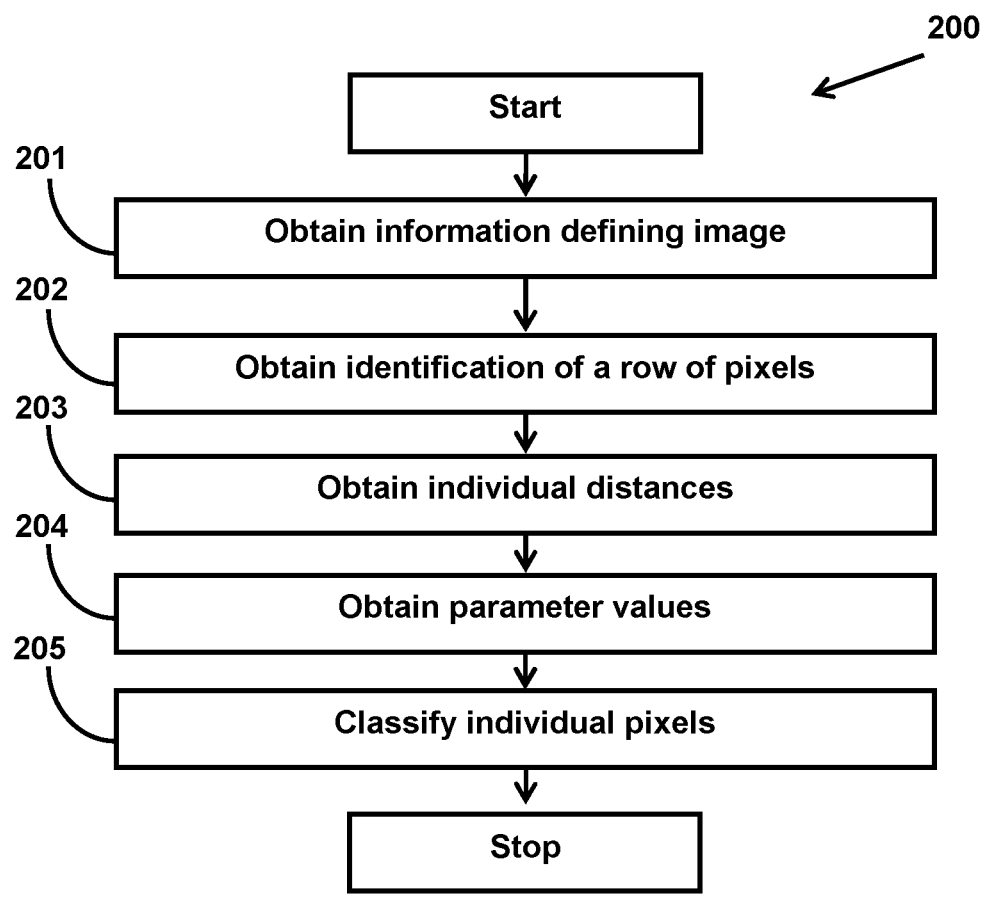
FIG. 2 illustrates a method of distinguishing between features depicted in an image, in accordance with one or more implementations.

FIG. 2 illustrates method 200 of distinguishing between features depicted in an image, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, information defining one or more images may be obtained. Individual images may include visual content and/or other content. The visual content may comprise an array of pixels. The information defining an individual image may define individual colors for individual pixels in a pixel array of the image and/or other information. An array of pixels may include multiple pixel rows. In some implementations, operation 201 may be performed by a processor component the same as or similar to image component 102 (shown in FIG. 1 and described herein).

At operation 202, identifications of individual rows of pixels as depicting a horizon in individual images may be obtained. In some implementations, operation 202 may be performed by a processor component the same as or similar to horizon component 104 (shown in FIG. 1 and described herein).

At operation 203, individual distances of individual pixels from an identified row of pixels may be obtained. By way of non-limiting illustration, a first pixel in an image may be a first distance above a row of pixels. By way of non-limiting illustration, a second pixel of the image may be a second distance below the row of pixels. In some implementations, operation 203 may be performed by a processor component the same as or similar to distance component 106 (shown in FIG. 1 and described herein).

At operation 204, parameter values for a set of pixel parameters of individual pixels may be obtained. The set of pixel parameters may include a first pixel parameter. A first parameter value of the first pixel parameter may be obtained for a first pixel of an image. A second parameter value of the first pixel parameter may be obtained for a second pixel of the image. In some implementations, operation 204 may be performed by a processor component the same as or similar to parameter component 108 (shown in FIG. 1 and described herein).

At operation 205, individual pixels may be classified as depicting one of a plurality of features. A plurality of features may include one or more of a first feature, a second feature, and/or other features. The classification may be based on one or more of individual distances of individual pixels from an identified row of pixels, individual parameter values for the set of pixel parameters, and/or other information. By way of non-limiting illustration, based on a first pixel being a first distance above a row of pixels and a first parameter value of a first pixel parameter of the first pixel, the first pixel may be classified as depicting the first feature. By way of non-limiting illustration, based on a second pixel being a second distance below the row of pixels and a second parameter value of the first pixel parameter of the second pixel, the second pixel may be classified as depicting the second feature. In some implementations, operation 205 may be performed by a processor component the same as or similar to classification component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to distinguish between features depicted in an image, the system comprising:
   one or more physical processors configured by machine-readable instructions to:
     obtain information defining an image, the image comprising an array of pixels, the information defining colors for the array of pixels;
     obtain an identification of a row of pixels as depicting a horizon in the image;
     obtain distances of different pixels above and below the row of pixels from the row of pixels;
     obtain values of a set of pixel parameters for the different pixels;
     classify the different pixels as depicting different features based on the distances and the values of the set of pixel parameters;
   identify a set of pixels as depicting a boundary between the different features based on the classifications; and
   effectuate an image effect on the image based on the identification of the boundary between the different features.

2. The system of claim 1, wherein the image depicts a scene, and wherein the different features include a first feature and a second feature of the scene depicted in the image.

3. The system of claim 2, wherein the first feature corresponds to a depiction of sky in the scene and the second feature corresponds to a depiction of land in the scene.

4. The system of claim 2, wherein the different pixels include a first pixel and a second pixel, and the one or more physical processors are, to identify the set of pixels as depicting the boundary between the different features, further configured by machine-readable instructions to:
   determine pixels groups, the pixel groups including a first pixel group and a second pixel group, the first pixel group including the first pixel, the second pixel group including the second pixel; and
   responsive to at least one pixel in individual ones of the pixel groups being classified as an individual feature, classify the individual pixel groups as depicting the corresponding individual features such that:
     responsive to the first pixel being classified as depicting the first feature, the first group of pixels is classified as depicting the first feature;
     responsive to the second pixel being classified as depicting the second feature, the second group of pixels is classified as depicting the second feature; and
   identify pixels of the first pixel group adjacent to the pixels of the second pixel group as the set of pixels depicting the boundary between the first feature and the second feature.

5. The system of claim 4, wherein the pixels groups are determined based on the values of the set of pixel parameters.

6. The system of claim 1, wherein the set of pixel parameters includes a first color parameter, a second color parameter, and a third color parameter.

7. The system of claim 6, wherein the first color parameter corresponds to a first color component of the colors of the pixels in the array, the second color parameter corresponds to a second color component of the colors of the pixels in the array, and the third color parameter corresponds to a third color component of the colors of the pixels in the array.

8. The system of claim 7, wherein the first color component, second color component, and third color component correspond to individual colors channels of an RGB color space, and wherein values of the first color component, second color component, and third color component are chromaticities of the individual color channels.

9. The system of claim 1, wherein the image effect includes a text effect or a transition effect.

10. The system of claim 9, wherein the text effect includes text that scrolls over the image using the set of pixels identified as depicting the boundary between the different features as a reference such that the text appears to appear from behind one of the different features.

11. A method of distinguishing between features depicted in an image, the method being implemented in a computer system comprising one or more physical processors and non-transitory electronic storage storing machine-readable instructions, the method comprising:
    obtaining information defining an image, the image comprising an array of pixels, the information defining colors for the array of pixels;
    obtaining an identification of a row of pixels as depicting a horizon in the image;
    obtaining distances of different pixels above and below the row of pixels from the row of pixels;
    obtaining values of a set of pixel parameters for the different pixels;
    classifying the different pixels as depicting different features based on the distances and the values of the set of pixel parameters;
    identifying a set of pixels as depicting a boundary between the different features based on the classifications; and
    effectuating an image effect on the image based on the identification of the boundary between the different features.

12. The method of claim 11, wherein the image depicts a scene, and wherein the different features include a first feature and a second feature of the scene depicted in the image.

13. The method of claim 12, wherein the first feature corresponds to a depiction of sky in the scene and the second feature corresponds to a depiction of land in the scene.

14. The method of claim 12, wherein the different pixels include a first pixel and a second pixel, and identifying the set of pixels as depicting the boundary between the different features includes:
- determining pixels groups, the pixel groups including a first pixel group and a second pixel group, the first pixel group including the first pixel, the second pixel group including the second pixel; and
- responsive to at least one pixel in individual ones of the pixel groups being classified as an individual feature, classifying the individual pixel groups as depicting the corresponding individual features, such that:
  - responsive to the first pixel being classified as depicting the first feature, classifying the first group of pixels as depicting the first feature;
  - responsive to the second pixel being classified as depicting the second feature, classifying the second group of pixels as depicting the second feature; and
  - identifying pixels of the first pixel group adjacent to the pixels of the second pixel group as the set of pixels depicting the boundary between the first feature and the second feature.

15. The method of claim 14, wherein the pixels groups are determined based on the values of the set of pixel parameters.

16. The method of claim 11, wherein the set of pixel parameters includes a first color parameter, a second color parameter, and a third color parameter.

17. The method of claim 16, wherein the first color parameter corresponds to a first color component of the colors of the pixels in the array, the second color parameter corresponds to a second color component of the colors of the pixels in the array, and the third color parameter corresponds to a third color component of the colors of the pixels in the array.

18. The method of claim 17, wherein the first color component, second color component, and third color component correspond to individual colors channels of an RGB color space, and wherein values of the first color component, second color component, and third color component are chromaticities of the individual color channels.

19. The method of claim 11, wherein the image effect includes a text effect or a transition effect.

20. The method of claim 19, wherein the text effect includes text that scrolls over the image using the set of pixels identified as depicting the boundary between the different features as a reference such that the text appears to appear from behind one of the different features.

* * * * *